US012203768B2

(12) United States Patent
Cowburn et al.

(10) Patent No.: US 12,203,768 B2
(45) Date of Patent: Jan. 21, 2025

(54) AUGMENTED REALITY GUIDANCE INTERFACE

(71) Applicant: Snap Inc., Santa Monica, CA (US)

(72) Inventors: Piers Cowburn, London (GB); David Li, London (GB); Isac Andreas Müller Sandvik, London (GB); Qi Pan, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/991,413

(22) Filed: Nov. 21, 2022

(65) Prior Publication Data
US 2023/0085791 A1 Mar. 23, 2023

Related U.S. Application Data

(63) Continuation of application No. 16/365,256, filed on Mar. 26, 2019, now Pat. No. 11,598,643.

(51) Int. Cl.
*G01C 21/36* (2006.01)
*G06T 19/00* (2011.01)
(Continued)

(52) U.S. Cl.
CPC ........ *G01C 21/3632* (2013.01); *G06T 19/006* (2013.01); *G06V 30/413* (2022.01); *H04W 4/021* (2013.01); *H04W 4/029* (2018.02)

(58) Field of Classification Search
CPC ............ G01C 21/3626; G01C 21/3632; G01C 21/3644; G06Q 30/0259; G06T 19/006;
(Continued)

(56) References Cited

U.S. PATENT DOCUMENTS 11,598,643 B2    3/2023   Cowburn et al.
2012/0143501 A1*  6/2012  Tang ............... G01C 21/3476
                                                    701/445
(Continued)

FOREIGN PATENT DOCUMENTS

CN    106462637 A    2/2017
CN    113631886 A    11/2021
(Continued)

OTHER PUBLICATIONS

"U.S. Appl. No. 16/365,256, Final Office Action mailed Feb. 9, 2022", 12 pgs.
(Continued)

*Primary Examiner* — Charles J Han
(74) *Attorney, Agent, or Firm* — Schwegman Lundberg & Woessner, P.A.

(57) ABSTRACT

Example embodiments described herein therefore relate to an AR guidance system to perform operations that include: detecting a client device at a location within a geo-fenced area, wherein the geo-fenced area may include within it, a destination of interest; determining a route to the destination of interest from the location of the client device within the geo-fenced area; causing display of a presentation of an environment within an AR interface at the client device; detecting a display of real-world signage within the presentation of the environment; generating a media item in response to the detecting the display of the signage within the presentation of the environment, wherein the media item is based on the route to the destination of interest; and
(Continued)

causing display of the media item within the AR interface based on the position of the signage within the presentation of the environment.

17 Claims, 10 Drawing Sheets

(51) Int. Cl.
*G06V 30/413* (2022.01)
*H04W 4/021* (2018.01)
*H04W 4/029* (2018.01)

(58) Field of Classification Search
CPC .... G06V 30/413; H04W 4/021; H04W 4/023; H04W 4/029
See application file for complete search history.

(56) References Cited

U.S. PATENT DOCUMENTS

| | | |
|---|---|---|
| 2012/0324342 A1 | 12/2012 | Donley |
| 2013/0110633 A1 | 5/2013 | Waldman et al. |
| 2015/0049905 A1 | 2/2015 | Chudy et al. |
| 2015/0175068 A1 | 6/2015 | Szostak et al. |
| 2015/0233715 A1 | 8/2015 | Xu et al. |
| 2016/0202076 A1* | 7/2016 | Feng .................. G01C 21/343 701/400 |
| 2017/0074675 A1 | 3/2017 | Waldman |
| 2017/0370736 A1 | 12/2017 | Singh |
| 2018/0094939 A1 | 4/2018 | Holmes |
| 2018/0299272 A1 | 10/2018 | Salowitz |
| 2019/0086227 A1* | 3/2019 | Laaksonen ......... G01C 21/3682 |
| 2020/0045501 A1* | 2/2020 | Fox ....................... H04W 4/025 |
| 2020/0159251 A1 | 5/2020 | Iwasaki et al. |
| 2020/0309558 A1 | 10/2020 | Cowburn et al. |

FOREIGN PATENT DOCUMENTS

| | | |
|---|---|---|
| KR | 20130085653 A | 7/2013 |
| WO | WO-2015077766 A1 | 5/2015 |
| WO | WO-2016114918 A1 | 7/2016 |
| WO | WO-2018230738 A1 | 12/2018 |
| WO | WO-2020198364 A1 | 10/2020 |

OTHER PUBLICATIONS

"U.S. Appl. No. 16/365,256, Non Final Office Action mailed May 24, 2022", 13 pgs.

"U.S. Appl. No. 16/365,256, Non Final Office Action mailed Nov. 9, 2021", 12 pgs.

"U.S. Appl. No. 16/365,256, Notice of Allowance mailed Oct. 14, 2022", 5 pgs.

"U.S. Appl. No. 16/365,256, Response filed Jan. 5, 2022 to Non Final Office Action mailed Nov. 9, 2021", 14 pgs.

"U.S. Appl. No. 16/365,256, Response filed May 9, 2022 to Final Office Action mailed Feb. 9, 2022", 11 pgs.

"U.S. Appl. No. 16/365,256, Response filed Jun. 9, 2022 to Non Final Office Action mailed May 24, 2022", 12 pgs.

"European Application Serial No. 20721864.5, Communication Pursuant to Article 94(3) EPC mailed Oct. 26, 2022", 9 pgs.

"European Application Serial No. 20721864.5, Response to Communication Pursuant to Article 94(3) EPC mailed Oct. 26, 2022", 23 pgs.

"International Application Serial No. PCT/US2020/024724, International Preliminary Report on Patentability mailed Oct. 7, 2021", 10 pgs.

"International Application Serial No. PCT/US2020/024724, International Search Report mailed Jul. 21, 2020", 5 pgs.

"International Application Serial No. PCT/US2020/024724, Written Opinion mailed Jul. 21, 2020", 8 pgs.

"Korean Application Serial No. 10-2021-7034827, Notice of Preliminary Rejection mailed Mar. 28, 2023", w/ English Translation, 14 pgs.

"Chinese Application Serial No. 202080023979.8, Response filed May 10, 2024 to Office Action mailed Jan. 10, 2024", W/English Claims, 16 pgs.

"Korean Application Serial No. 10-2024-7001397, Notice of Preliminary Rejection mailed Jan. 26, 2024", w/ English Translation, 14 pgs.

"Chinese Application Serial No. 202080023979.8, Office Action mailed Jan. 10, 2024", w/ English translation, 13 pgs.

"Chinese Application Serial No. 202080023979.8, Office Action mailed Jun. 15, 2024", w/ English translation, 12 pgs.

* cited by examiner

500

```
┌─────────────────────────────────────────────────────────────┐
│ DETECTING THE CLIENT DEVICE WITHIN A THRESHOLD DISTANCE OF THE │
│                  DESTINATION OF INTEREST                     │
│                            502                               │
└─────────────────────────────────────────────────────────────┘
                              │
                              ▼
┌─────────────────────────────────────────────────────────────┐
│   ACCESSING MEDIA CONTENT ASSOCIATED WITH THE DESTINATION OF │
│ INTEREST IN RESPONSE TO THE DETECTING THE CLIENT DEVICE WITHIN│
│    THE THRESHOLD DISTANCE OF THE DESTINATION OF INTEREST     │
│                            504                               │
└─────────────────────────────────────────────────────────────┘
                              │
                              ▼
┌─────────────────────────────────────────────────────────────┐
│  DETECTING A DISPLAY OF A SIGNAGE WITHIN THE PRESENTATION OF │
│                      THE ENVIRONMENT                         │
│                            506                               │
└─────────────────────────────────────────────────────────────┘
                              │
                              ▼
┌─────────────────────────────────────────────────────────────┐
│  PRESENTING THE MEDIA CONTENT WITHIN THE PRESENTATION OF THE │
│     ENVIRONMENT BASED ON THE DISPLAY OF THE SIGNAGE          │
│                            508                               │
└─────────────────────────────────────────────────────────────┘
```

*FIG. 5*

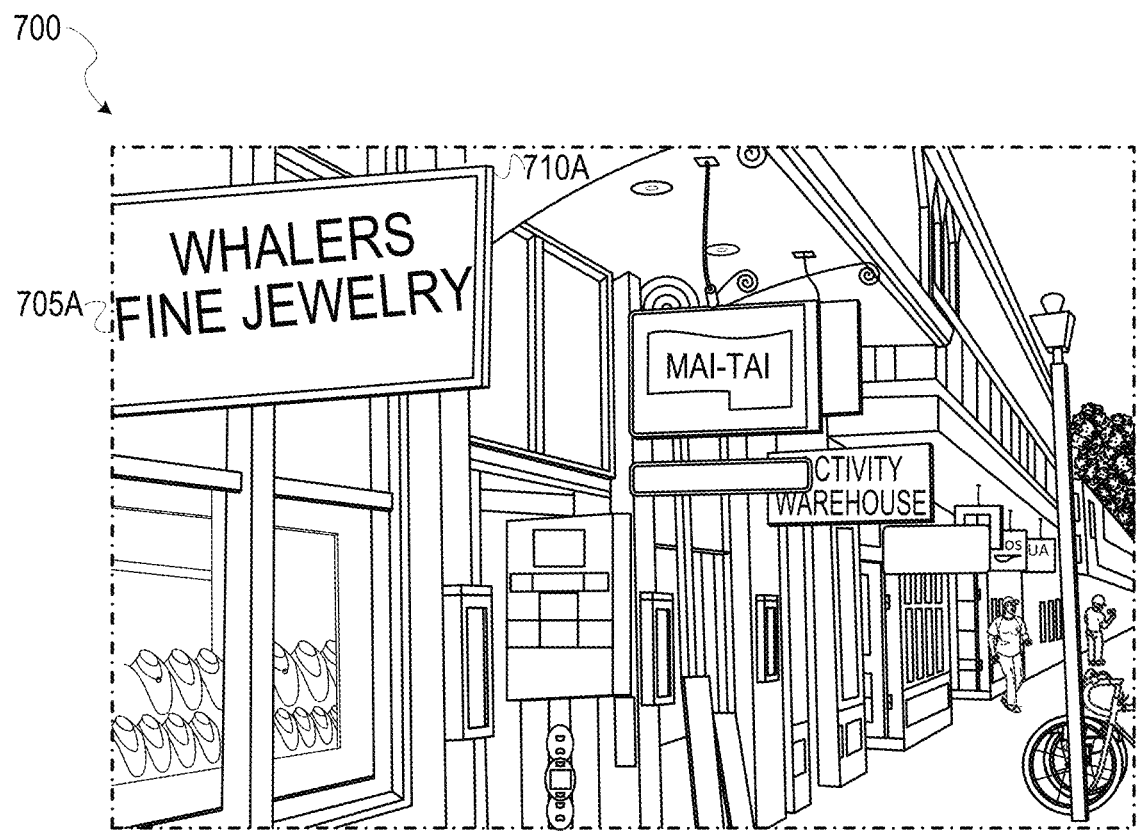
FIG. 7

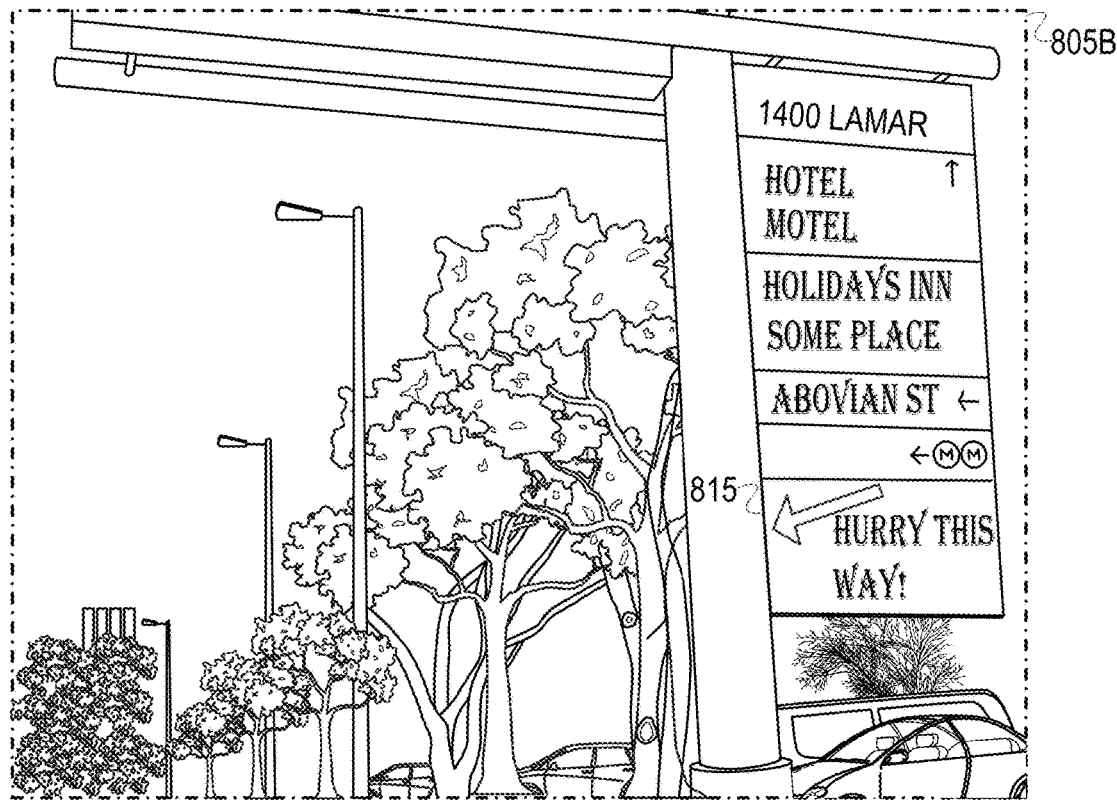
FIG. 8

AUGMENTED REALITY GUIDANCE INTERFACE

CROSS-REFERENCE TO RELATED APPLICATION

This application is a continuation of U.S. patent application Ser. No. 16/365,256, filed Mar. 26, 2019, which is incorporated by reference herein in its entirety.

TECHNICAL FIELD

Embodiments of the present disclosure relate generally to graphical user interfaces (GUI), and more particularly, to systems for generating and causing display of augmented reality (AR) content within GUI.

BACKGROUND

Augmented reality (AR), is a live direct or indirect view of a physical, real-world environment whose elements are augmented by computer-generated sensory inputs.

In an unrelated field, turn-by-turn navigation is a feature of some navigation devices, where directions for a selected route are continually presented to the user in the form of spoken, or in some instances, visual instructions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 is a flowchart illustrating a method for presenting AR content at a client device, according to certain example embodiments.

FIG. 7 is an interface diagram depicting AR content, according to certain example embodiments.

FIG. 8 is an interface diagram depicting AR content, according to certain example embodiments.

DETAILED DESCRIPTION

Figure 1:
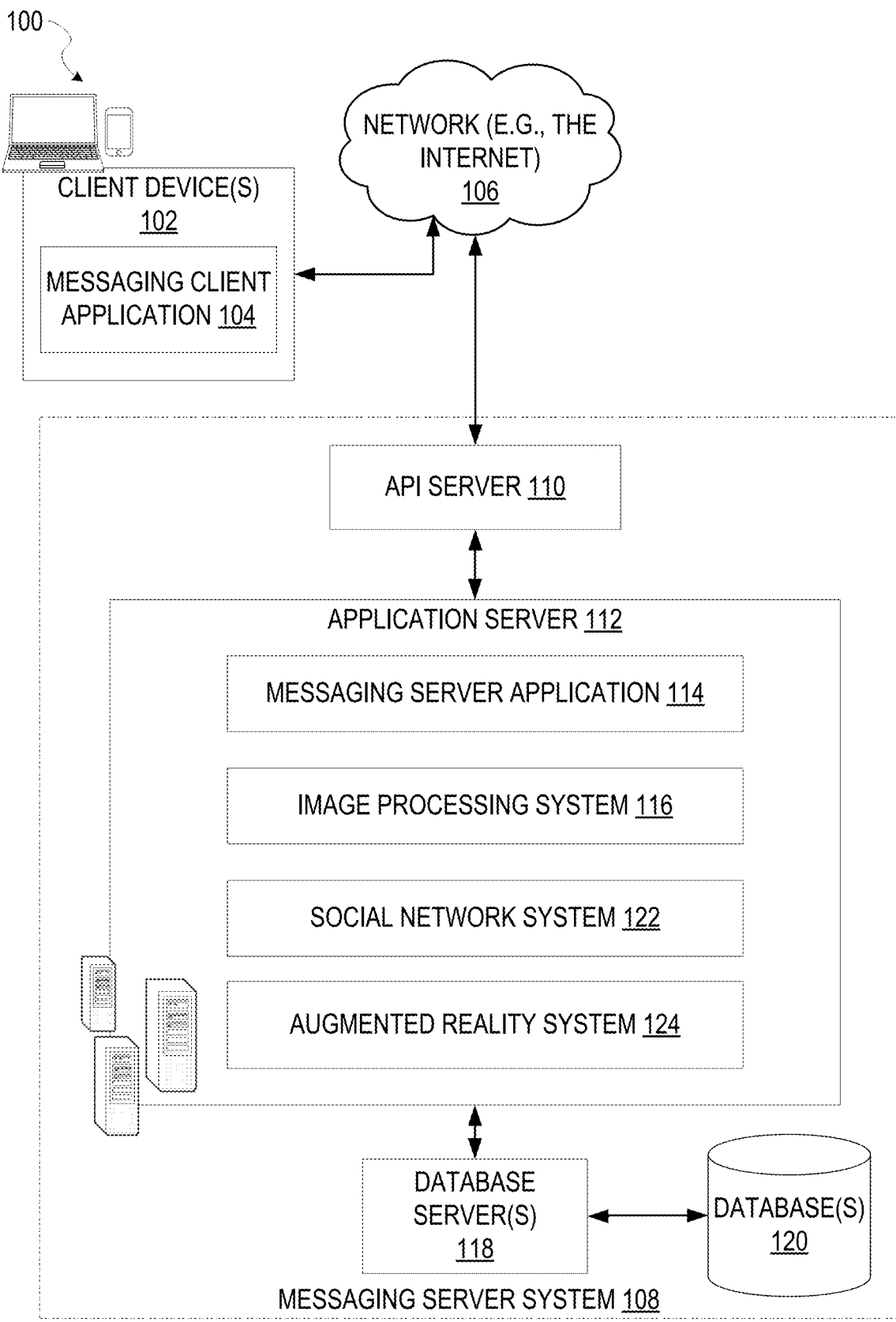
FIG. 1 is a block diagram showing an example messaging system for exchanging data (e.g., messages and associated content) over a network in accordance with some embodiments, wherein the messaging system includes an augmented reality (AR) system.

As discussed above, AR systems provide users within graphical user interfaces (GUI) to display a live direct or indirect view of a physical, real-world environment, wherein elements of the view are augmented by computer-generated sensory inputs. For example, an AR interface may present media content at positions within a display of a view of a real-world environment, such that the media content appears to interact with elements in the real-world environment.

By making use of an AR system, and implementing it in the context of a turn-by-turn navigation system, an interactive AR guidance system may be configured to make use of real-world signage to direct a user to a specific location. For example, a user may be navigated through a city by first determining a destination of the user and then calculating a route to the destination. The AR guidance system may then identify real-world signage (e.g., sign posts, hanging signs, etc.), and "augment" a presentation of the signage by either adding (i.e., overlaying) additional signage proximate to the real-world signage within an AR display, or modifying existing real-world signage in an AR display. The modified or added signage may be oriented to point the user in the direction that the user should be going in order to reach their final destination, and in some embodiments could include animations or other media content.

Example embodiments described herein therefore relate to an AR guidance system to perform operations that include: detecting a client device at a location within a geo-fenced area, wherein the geo-fenced area may include within it, a destination of interest; determining a route to the destination of interest from the location of the client device within the geo-fenced area; causing display of a presentation of an environment within an AR interface at the client device; detecting a display of real-world signage within the presentation of the environment; generating a media item in response to the detecting the display of the signage within the presentation of the environment, wherein the media item is based on the route to the destination of interest; and causing display of the media item within the AR interface based on the position of the signage within the presentation of the environment.

According to some example embodiments, generating the media item based on the route to the destination of interest within the geo-fenced area may include determining a direction of travel based on the location of the client device relative to the destination of interest, and the route to the destination of interest, and selecting a directional indicator that includes a graphical symbol such as an arrow, to indicate to the user the direction of travel.

In some embodiments, the AR guidance system may identify attributes or features of the signage detected within the presentation of the environment in order to generate a style template to configure AR media items. The attributes or features may include a shape of the signage, a color of the signage, graphics displayed on the signage, physical properties (e.g., damage, flickering lights), a font of text displayed on the signage, a character weight of the text, as well as a size of the signage. Doing so enabled the AR guidance system to generate media items that can be presented within an AR interface in a way that appears as though the media item matches the existing real-world signage.

In some embodiments, responsive to detecting the client device within a threshold distance of the destination of interest, the AR guidance system may retrieve or otherwise access media content associated with the threshold distance (or the threshold distance and the destination of interest).

The retrieved media content may then be presented upon signage detecting within the environment within the AR interface. For example, the media content may be presented as an incentive to encourage the user to continue following the path presented by directional indicators (e.g., "You're getting close!"). In some embodiments, the media content may be customized or modified based on one or more user attributes associated with a user of the client device, such as a name or user-name, as well as certain demographics information.

In some example embodiments, responsive to detecting the client device within a geo-fenced area, the AR guidance system may access a user profile associated with the client device to retrieve user profile information. The user profile information may then be used by the AR guidance system to select a destination of interest for the user.

Consider an illustrative example from a user perspective. A user may enter into a geo-fenced area, such as an amusement park or downtown area. Responsive to detecting the user within the geo-fenced area, the AR guidance system retrieves user profile information associated with the user, and identifies a destination of interest to the user within the geo-fenced area. The AR guidance system them calculates a route to the destination of interest, and begins identifying signage presented within an AR interface of a client device of the user. The AR guidance system may then augment a presentation of the user's environment, by modifying or adding signage to existing signage to provide a directional indicator that guides the user to the destination of interest. As the user approaches the destination of interest, the AR guidance system may retrieve media content associated with the destination of interest, and augment the signage further using the media content.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an augmented reality (AR) system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
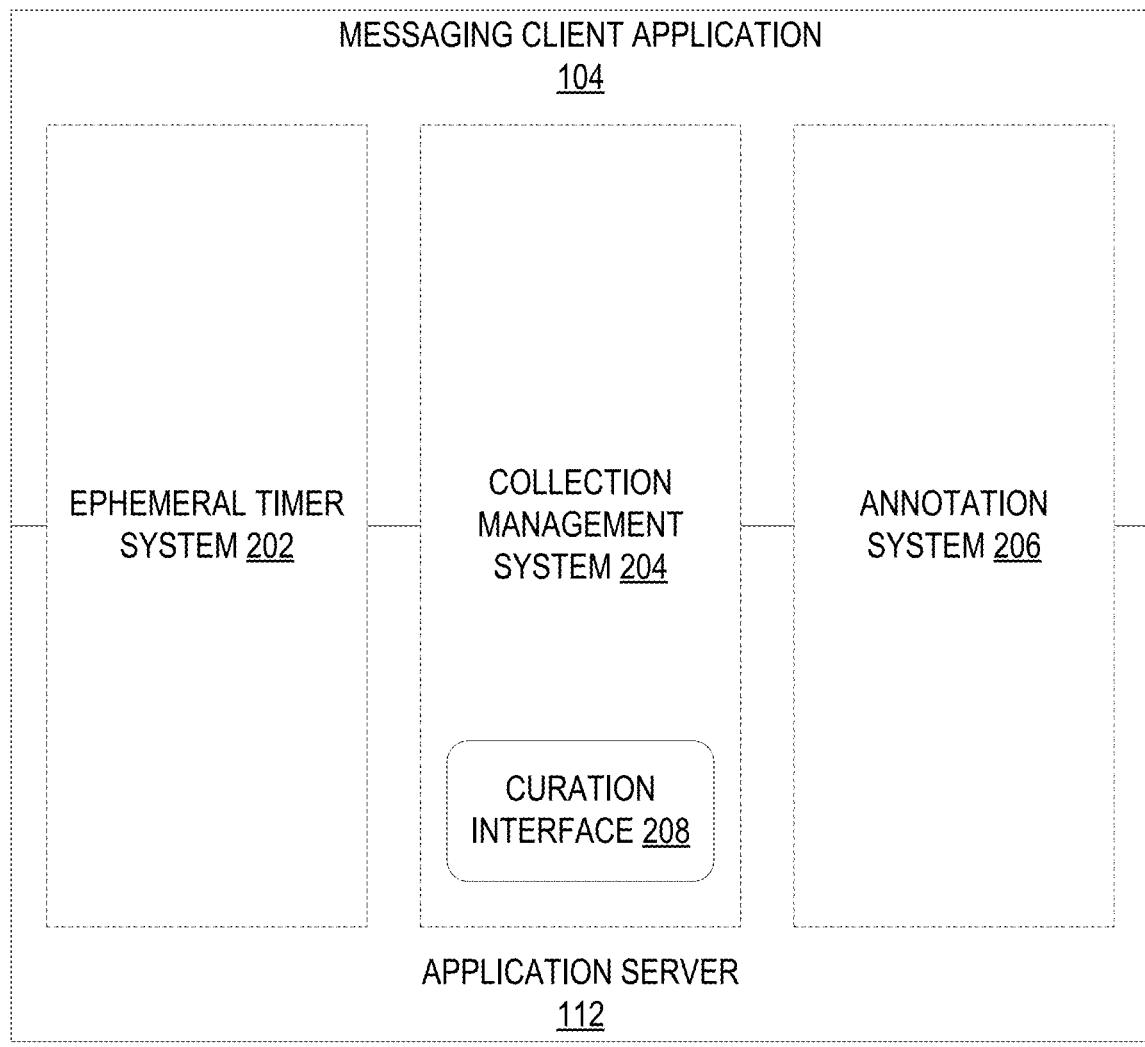
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content, such as user support content received by the user to be forwarded or redistributed to one or more recipients. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
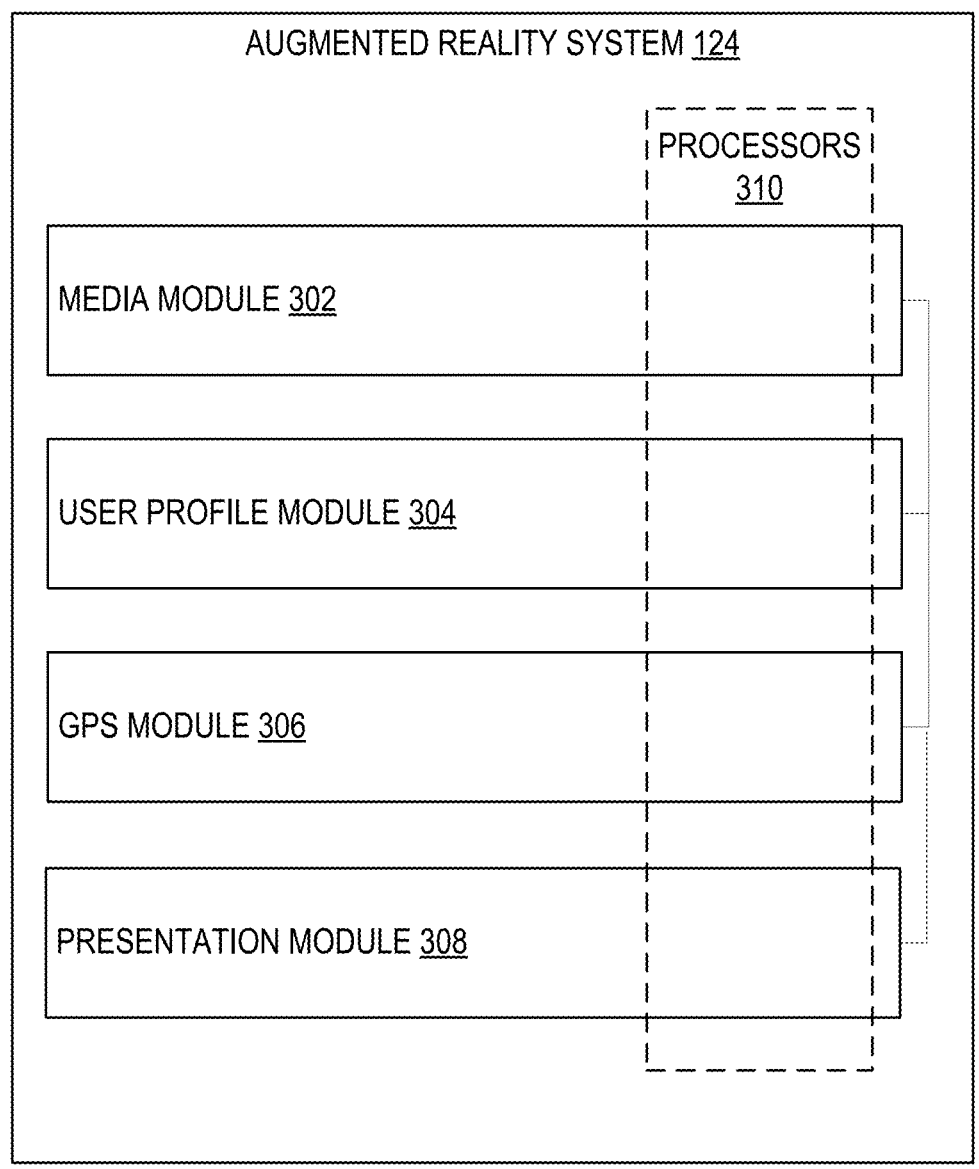
FIG. 3 is a block diagram illustrating various modules of an AR system, according to certain example embodiments.

In another example embodiment, the annotation system 206 provides a merchant-based publication platform that enables merchants to select a particular media overlay associated with a geolocation. For example, the annotation system 206 associates the media overlay of a highest bidding merchant with a corresponding geolocation for a predefined amount of time FIG. 3 is a block diagram illustrating components of the AR system 124 that configure the AR system 124 to detect a client device 102 within a geo-fenced region, identify a destination of interest based on one or more attributes associated with the client device 102, generate a route to the destination of interest from a location of the client device 102 within the geo-fenced region, detect signage within a presentation of an environment at the client device 102, select a directional indicator based on the route to the destination of interest, and cause display of the directional indicator at a position based on the signage within an AR interface at the client device 102. The AR system 124 is shown as including a media module 302, a user profile module 304, a global positioning system (GPS) module 306, and a presentation module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the AR system 124 may physically include an arrangement of one or more of the processors 310 (e.g., a subset of or among the one or more processors of the machine) configured to perform the operations described herein for that module. As another example, any module of the AR system 124 may include software, hardware, or both, that configure an arrangement of one or more processors 310 (e.g., among the one or more processors of the machine) to perform the operations described herein for that module. Accordingly, different modules of the AR system 124 may include and configure different arrangements of such processors 310 or a single arrangement of such processors 310 at different points in time. Moreover, any two or more modules of the AR system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
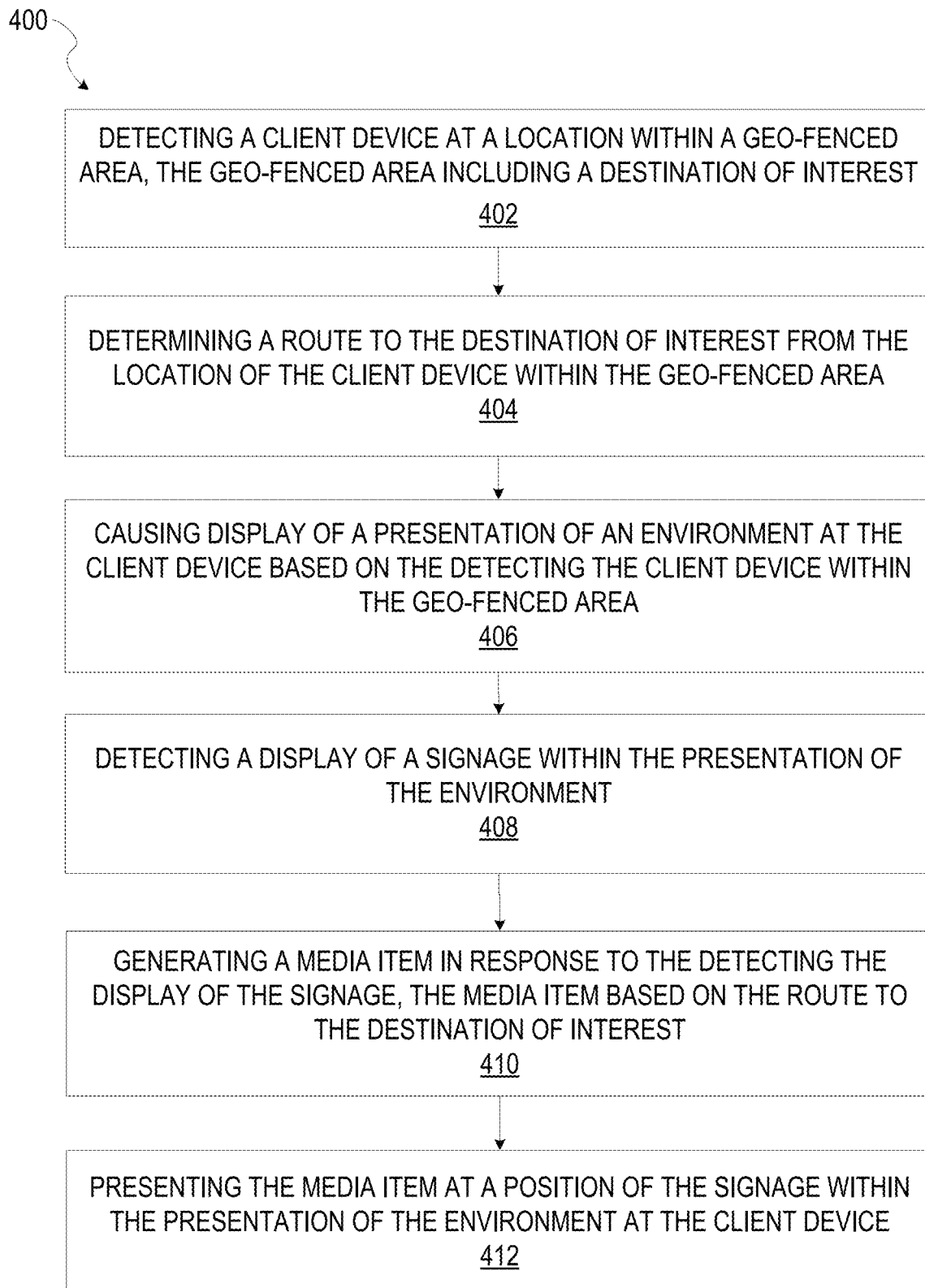
FIG. 4 is a flowchart illustrating a method for presenting AR content at a client device, according to certain example embodiments.

FIG. 4 is a flowchart illustrating a method 400 for causing display of an interactive information interface, according to certain example embodiments. Operations of the method 400 may be performed by the modules described above with respect to FIG. 3. As shown in FIG. 4, the method 400 includes one or more operations 402, 404, 406, 408, 410, and 412.

At operation 402, the GPS module 306 detects a client device 102 at a location within a geo-fenced area, wherein the geo-fenced area includes one or more destination of interest.

In some embodiments, the one or more destinations of interest may each be associated with a predefined set of user or devices attributes, or a user context, such as a time of day, or relative location. Responsive to detecting the client device 102 within the geo-fenced area, the media module 302 identifies a destination of interest based on the user or device attributes, or a user context. The user or device attributes may include user profile information, such as demographics information (e.g., age/age range, location, gender identity), and user behaviors (e.g., likes, follows, etc.). The user context may include a time of day, a season, a location of the user within the geo-fenced area (e.g., a location along the boundary of the geo-fenced area in which the user entered the geo-fenced area).

At operation 404, the GPS module 306 determines a route from a location of the client device 102 to the destination of interest within the geo-fenced area. The route may include a "fastest route," as well as a predefined route based on the destination of interest and the user attributes and user context.

For example, a destination of interest may be associated with one or more routes based on a location of a device and certain user profile information, such that user's that possess certain user profile information may be guided along a fastest route to the destination of interest, while user's that possess another set of user profile information may be guided along a different route.

At operation 406, the presentation module 308 causes display of a presentation of an environment at the client device 102. The presentation of the environment may be generated by a camera associated with the client device 102 and displayed within an AR interface at the client device 102.

At operation 408, the media module 302 detects a display of signage at a position within the presentation of the environment. According to certain example embodiments, the media module 302 may employ one or more image or pattern recognition techniques.

In some embodiments, the media module 302 may identify signage based on the existence of one or more colors of interest (e.g., the shade of red on stop signs, the shade of green on highway signs, the shade of yellow on traffic signs). For example, the media module 302 may detect the one or more colors of interest using a camera associated with the client device 102.

In some embodiments, the media module 302 may employ shape-based detection methods, or corner-based detection methods. For example, in such embodiment, the media module 302 may be configured to employ generalized Hough transforms for finding shapes in images, wherein predefined shapes such as polygons may be detected within images.

In some embodiments, the media module 302 may detect signage within a presentation of an environment by utilizing machine learning techniques, by training the media module 302 using training data that comprises images of various types of signage (e.g., street signs, license plates, store signs, etc.).

At operation 410, the media module 302 generates a media item within the AR interface, based on the position of the signage within the presentation of the environment, and the route to the destination of interest. For example, the media item may include media content associated within the destination of interest, as well as a directional indicator to guide the user to the destination of interest (e.g., an arrow).

In some embodiments, the media module 302 may generate the media item based on the route to the destination of interest, as well as one or more attributes associated with the client device 102, such as user profile information. For example, the media module 302 may retrieve a user identifier associated with a user of the client device 102 and generate a customized media item to direct the user of the client device 102 to the destination of interest (e.g., "Make a left here, USER_A!"). In certain embodiments, the user profile information may additionally include language preferences.

At operation 412, the presentation module 308 causes display of the media item generated by the media module 302 at the position of the signage within the presentation of the environment, within the AR interface of the client device 102. The client device 102 may thereby present an AR interface that depicts directional indicators guiding the user to a destination of interest, by presenting the directional indicators upon real-world signage presented within the presentation of the environment.

FIG. 5 is a flowchart illustrating a method 500 for presenting AR content at a client device 102, according to certain example embodiments. Operations of the method 500 may be performed by the modules described above with respect to FIG. 3. As shown in FIG. 5, the method 500 includes one or more operations 502, 504, 506, and 508, that may be performed as a part of (e.g., a subroutine) the method 400 depicted in FIG. 4.

At operation 502, the GPS module 306 detects the client device 102 within a threshold distance of the destination of interest. For example, the destination of interest may itself contain a number of thresholds, wherein each threshold is associated with media content to be presented to devices upon transgressing the threshold. Accordingly, responsive to determining the route to the destination of interest, as in operation 404 of the method 400, the GPS module 306 may retrieve the thresholds from a memory location associated with the destination of interest at the databases 120, in order to trigger events at the client device 102 responsive to detecting the client device 102 transgressing the thresholds.

At operation 504, responsive to the GPS module 306 detecting the client device 102 within a threshold distance of the destination of interest, the media module 302 accesses media content associated with the threshold of the destination of interest. For example, the media content associated with the threshold may include an indication of a distance to the destination of interest, as well as other incentivization to encourage the user of the client device 102 to continue on the route. Such incentivization may include images and animations to be presented within an AR interface.

At operation 506, the media module 302 detects a display of signage within the presentation of the environment at the client device 102, and at operation 508, generates and causes display of a presentation of the media content associated with the threshold of the destination of interest, at a position within the AR interface based on the display of the signage.

For example, the media content may include a graphical element indicating that the user of the client device 102 is some distance from the destination of interest (e.g., fifty feet, twelve parsecs).

Figure 6:
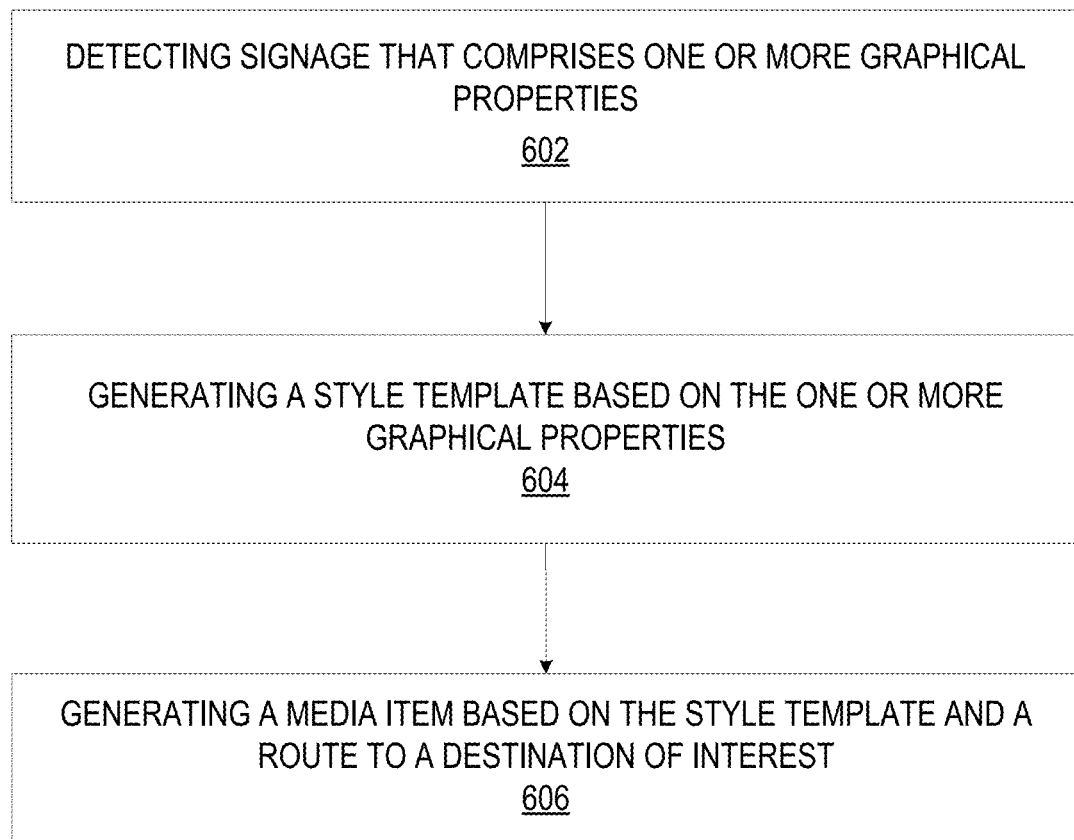
FIG. 6 is a flowchart illustrating a method for presenting AR content at a client device, according to certain example embodiments.

FIG. 6 is a flowchart illustrating a method 600 for presenting AR content at a client device 102, according to certain example embodiments. Operations of the method 600 may be performed by the modules described above with respect to FIG. 3. As shown in FIG. 6, the method 600 includes one or more operations 602, 604, and 606, that may be performed as a part of (e.g., a subroutine) the method 400 depicted in FIG. 4.

At operation 602, as in operations 408 of the method 400, and 506 of the method 500, the media module 302 detects signage within a presentation of an environment at a client device 102. Accordingly, the signage detected within the presentation of the environment may include one or more graphical properties such as a font, a character weight, a character style, a color, a shape, a size, as well as weathering (i.e., damage), or any patterns or graphics depicted on the signage.

At operation 604, the media module 302 generates a style template for the signage based on the one or more graphical properties of the signage detected by the media module 302. The style template may thereby define a set of graphical parameters of a media item to be generated and presented within the AR interface. At operation 606, the media module 302 generates a media item based on the one or more graphical properties defined by the style template.

FIG. 7 is an interface diagram 700 depicting AR content 715 and 720, presented in an AR interface 705B at a client device 102, as described in the methods 400, 500, and 600 as depicted in FIGS. 4, 5, and 6.

As seen in the interface diagram 700, the client device 102A may cause display of a presentation of an environment 705A, wherein the presentation of the environment 705A includes a display of signage, such as signage 710A.

Responsive to detecting the signage 710A, as seen in the presentation of the environment 705A, the AR guidance system 124 generates and causes display of AR content 715 and 720, wherein the AR content 715 and 720 include media items such as directional indicators, to guide a user of the client device 102 to a destination of interest.

According to certain embodiments, and as depicted in the interface diagram 700, the media items may be overlaid upon the presentation of the environment 705A to generate the AR interface 705B. In some embodiments, the media items 715 and 720 may be dynamic based on the perspective and position of the client device 102 relative to the corresponding signage.

FIG. 8 is an interface diagram 800 depicting AR content 815, presented in an AR interface 805B at a client device 102, as described in the methods 400, 500, and 600 as depicted in FIGS. 4, 5, and 6

As discussed in operation 604 of the method 600, the AR guidance system 124 may generate a style template based on one or more graphical properties of the signage 810 detected within the presentation of the environment 805A. The one or more graphical properties may for example include a font, a character weight of the font, colors, as well as a size of the text displayed on the signage 810.

Based on the one or more graphical properties, the AR guidance system 124 generates and causes display of the AR content 815 at a position within the AR interface 805B, based on the position of the signage 810. As seen in the interface diagram 800, the AR content includes text that matches the same font and style of the text from the signage 810.

According to certain embodiments, and as depicted in the interface diagram 800, the AR content 815 may include overlays upon existing signage, as well as media content that comprises new signage that does not actually exist in the real-world signage 810. For example, as seen in the AR interface 805B, the AR guidance system 124 extends the signage 810 to include the directional indicators presented in the AR content 815.

Software Architecture

Figure 9:
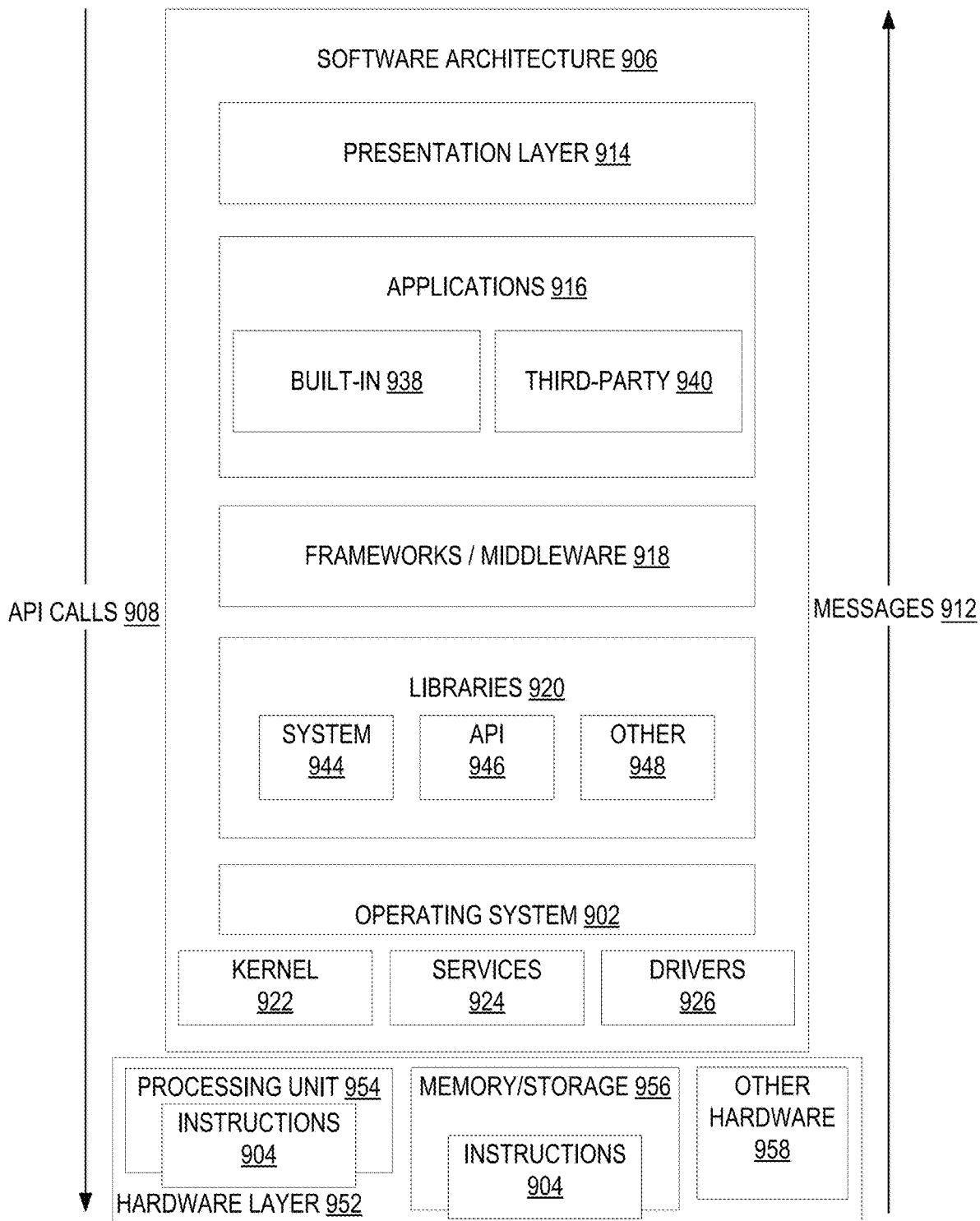
FIG. 9 is a block diagram illustrating a representative software architecture, which may be used in conjunction with various hardware architectures herein described and used to implement various embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as the machine 1000 of FIG. 10 that includes, among other things, processors 1004, memory 1014, and I/O components 1018. A representative hardware layer 952 is illustrated and can represent, for example, the machine 900 of FIG. 9. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, applications 916 and a presentation layer 914. Operationally, the applications 916 and/or other components within the layers may invoke application programming interface (API) API calls 908 through the software stack and receive a response as in response to the API calls 908. The layers illustrated are representative in nature and not all software architectures have all layers. For example, some mobile or special purpose operating systems may not provide a frameworks/ middleware 918, while others may provide such a layer. Other software architectures may include additional or different layers.

The operating system 902 may manage hardware resources and provide common services. The operating system 902 may include, for example, a kernel 922, services 924 and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924 and/or drivers 926), libraries 920, and frameworks/middleware 918 to create user interfaces to interact with users of the system. Alternatively, or additionally, in some systems interactions with a user may occur through a presentation layer, such as presentation layer 914. In these systems, the application/component "logic" can be separated from the aspects of the application/component that interact with a user.

Figure 10:
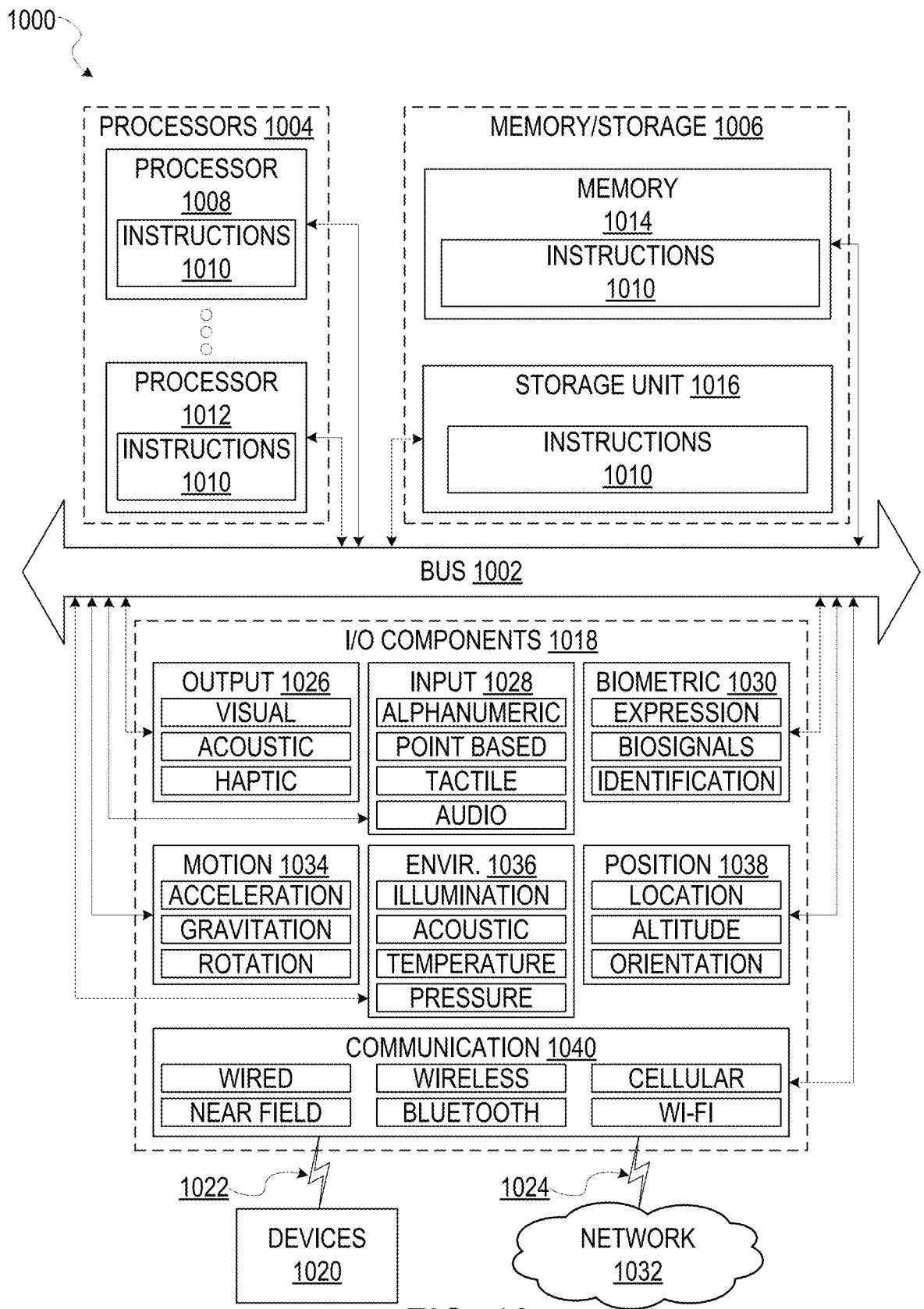
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental environment components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
    detecting a client device within a geo-fence, the client device associated with a user that corresponds with a user profile;
    accessing the user profile associated with the user responsive to detecting the client device within the geo-fence;
    determining a destination of interest based on the user profile associated with the user of the client device;
    determining a route to the destination of interest from a location of the client device;
    detecting the client device within a first threshold distance of the destination of interest, the first threshold distance from the destination of interest being associated with first media content;
    causing display of a first media item based on the route to the destination of interest and the first media content associated with the first threshold distance, the first media content comprising a first augmented reality overlay;
    detecting the client device within a second threshold distance of the destination of interest, the second threshold distance being associated with second media content; and
    causing display of a second media item based on the route to the destination of interest and the second media content associated with the second threshold distance, the second media item comprising a second augmented reality overlay.

2. The method of claim 1, wherein the causing display of the first media item based on the route to the destination of interest includes:
    determining a direction of travel based on the location of the client device and the destination of interest; and
    generating the first media item based on the direction of travel.

3. The method of claim 2, wherein the generating the first media item based on the direction of travel includes:
    selecting a graphical symbol from among a database of graphical symbols based on the direction of travel.

4. The method of claim 1, further comprising:
    detecting, at the client device, a display of signage within image data displayed at the client device; and
    generating the first media item based on the route to the destination of interest and the display of the signage.

5. The method of claim 4, wherein the display of the signage comprises one or more attributes, and wherein the generating the media item includes:
    generating the first media item based on the route to the destination of interest and the one or more attributes of the display of the signage.

6. The method of claim 1, wherein the destination of interest is a first destination of interest within a geo-fenced area, the geo-fenced area includes a plurality of destinations of interest, and the method further comprises:
    accessing a user profile of a user associated with the client device, the user profile comprising user profile information that includes the user attributes; and
    selecting the first destination of interest from among the plurality of destinations of interest based on the user profile information.

7. A system comprising:
    a memory; and
    at least one hardware processor coupled to the memory and comprising instructions that causes the system to perform operations comprising:
    detecting a client device within a geo-fence, the client device associated with a user that corresponds with a user profile;
    accessing the user profile associated with the user responsive to detecting the client device within the geo-fence;
    determining a destination of interest based on the user profile associated with the user of the client device;
    determining a route to the destination of interest from a location of the client device;
    detecting the client device within a first threshold distance of the destination of interest, the first threshold distance from the destination of interest being associated with first media content;
    causing display of a first media item based on the route to the destination of interest and the first media content associated with the first threshold distance, the first media content comprising a first augmented reality overlay;

detecting the client device within a second threshold distance of the destination of interest, the second threshold distance being associated with second media content; and causing display of a second media item based on the route to the destination of interest and the second media content associated with the second threshold distance, the second media item comprising a second augmented reality overlay.

8. The system of claim 7, wherein the causing display of the first media item based on the route to the destination of interest includes:

determining a direction of travel based on the location of the client device and the destination of interest; and generating the media item based on the direction of travel.

9. The system of claim 8, wherein the generating the first media item based on the direction of travel includes:

selecting a graphical symbol from among a database of graphical symbols based on the direction of travel.

10. The system of claim 7, further comprising:

detecting, at the client device, a display of signage within image data displayed at the client device; and generating the first media item based on the route to the destination of interest and the display of the signage.

11. The system of claim 10, wherein the display of the signage comprises one or more attributes, and wherein the generating the first media item includes:

generating the first media item based on the route to the destination of interest and the one or more attributes of the display of the signage.

12. The system of claim 7, wherein the destination of interest is a first destination of interest within a geo-fenced area, the geo-fenced area includes a plurality of destinations of interest, and the system further comprises:

accessing a user profile of a user associated with the client device, the user profile comprising user profile information that includes the user attributes; and selecting the first destination of interest from among the plurality of destinations of interest based on the user profile information.

13. A non-transitory machine-readable storage medium comprising instructions that, when executed by one or more processors of a machine, cause the machine to perform operations comprising:

detecting a client device within a geo-fence, the client device associated with a user that corresponds with a user profile;

accessing the user profile associated with the user responsive to detecting the client device within the geo-fence;

determining a destination of interest based on the user profile associated with the user of the client device;

determining a route to the destination of interest from a location of the client device;

detecting the client device within a first threshold distance of the destination of interest, the first threshold distance from the destination of interest being associated with first media content;

causing display of a first media item based on the route to the destination of interest and the first media content associated with the first threshold distance, the first media content comprising a first augmented reality overlay;

detecting the client device within a second threshold distance of the destination of interest, the second threshold distance being associated with second media content; and causing display of a second media item based on the route to the destination of interest and the second media content associated with the second threshold distance, the second media item comprising a second augmented reality overlay.

14. The non-transitory machine-readable storage medium of claim 13, wherein the causing display of the first media item based on the route to the destination of interest includes:

determining a direction of travel based on the location of the client device and the destination of interest; and generating the first media item based on the direction of travel.

15. The non-transitory machine-readable storage medium of claim 14, wherein the generating the first media item based on the direction of travel includes:

selecting a graphical symbol from among a database of graphical symbols based on the direction of travel.

16. The non-transitory machine-readable storage medium of claim 13, further comprising:

detecting, at the client device, a display of signage within image data displayed at the client device; and generating the first media item based on the route to the destination of interest and the display of the signage.

17. The non-transitory machine-readable storage medium of claim 16, wherein the display of the signage comprises one or more attributes, and wherein the generating the first media item includes:

generating the first media item based on the route to the destination of interest and the one or more attributes of the display of the signage.

* * * * *